(12) United States Patent
Dunne

(10) Patent No.: US 8,519,553 B2
(45) Date of Patent: Aug. 27, 2013

(54) POWER SUPPLY SYSTEMS

(75) Inventor: Julian Francis Dunne, Lewes (GB)

(73) Assignee: University of Sussex, Falmer, Brighton (GB)

( * ) Notice: Subject to any disclaimer, the term of this patent is extended or adjusted under 35 U.S.C. 154(b) by 354 days.

(21) Appl. No.: 12/740,669

(22) PCT Filed: Oct. 31, 2008

(86) PCT No.: PCT/GB2008/003697
§ 371 (c)(1),
(2), (4) Date: Oct. 22, 2010

(87) PCT Pub. No.: WO2009/056850
PCT Pub. Date: May 7, 2009

(65) Prior Publication Data
US 2011/0204650 A1    Aug. 25, 2011

(30) Foreign Application Priority Data
Nov. 2, 2007   (GB) .................................. 0721625.2

(51) Int. Cl.
*F02B 63/04* (2006.01)
(52) U.S. Cl.
USPC .......................................................... 290/1 A
(58) Field of Classification Search
USPC ..................... 290/1 R, 40 R, 4 R, 12, 19, 1 A
See application file for complete search history.

(56) References Cited

U.S. PATENT DOCUMENTS

| | | | |
|---|---|---|---|
| 2,943,450 A * | 7/1960 | Willson | 60/39.34 |
| 3,270,723 A * | 9/1966 | Maroney | 123/43 R |
| 3,580,228 A | 5/1971 | Rocha | |
| 3,602,203 A | 8/1971 | Mowry | |
| 4,146,020 A | 3/1979 | Moret | |
| 2005/0016493 A1 | 1/2005 | Hoose | |
| 2008/0245345 A1 | 10/2008 | Huettlin | |

FOREIGN PATENT DOCUMENTS

| | | |
|---|---|---|
| DE | 202004019630 | 5/2005 |
| DE | 102004061223 | 8/2006 |
| DE | 102005062529 | 6/2007 |
| GB | 594469 | 11/1947 |
| GB | 1159107 | 7/1969 |
| GB | 2356670 | 5/2001 |
| GB | 2454360 | 5/2009 |

(Continued)

OTHER PUBLICATIONS

PCT Search Report dated Oct. 4, 2010, PCT Patent Application PCT/GB2010/00862, filed Apr. 30, 2010.

(Continued)

*Primary Examiner* — Jean F Duverne
(74) *Attorney, Agent, or Firm* — Vierra Magen Marcus LLP

(57) ABSTRACT

A power supply system comprises an internal combustion engine (100) and an electric motor-generator arrangement that is coupled to the internal combustion engine. The internal combustion engine (100) has a piston-cylinder assembly in which the toroidal section-shaped piston (122) and cylinder (120) are each arranged to rotate, in use, about a common axis of rotation B with respect to a stator arrangement (129) of the associated motor-generator arrangement so as to generate an electric output. The piston (122) and cylinder (120) are also arranged to form a mass-elastic system that is capable of resonance and further arranged such that combustion in the combustion chamber (121) formed between the cylinder (120) and piston (122) can cause the piston (122) and cylinder (120) to oscillate relative to each other about their common rotational axis B.

16 Claims, 5 Drawing Sheets

(56) References Cited

FOREIGN PATENT DOCUMENTS

| | | |
|---|---|---|
| GB | 2454360 B | 4/2010 |
| WO | WO01/58211 | 8/2001 |
| WO | WO2006118437 | 11/2006 |

OTHER PUBLICATIONS

PCT Written Opinion of the International Searching Authority dated Apr. 10, 2010, PCT Patent Application PCT/GB2010/00862, filed Apr. 30, 2010.

English Translation of Abstract of German Patent Application DE202004019630.

PCT Search Report dated Mar. 11, 2009, PCT Patent Application PCT/GB2008/003697, filed Oct. 31, 2008.

Search Report dated Aug. 18, 2008, GB Patent Application GB0721625.2.

GB Combined Search and Examination Report dated Mar. 2, 2009, GB Patent Application GB0820030.5 (GB2454360).

English translation of the Abstract for DE 102004061223.

English Translation of Abstract of DE202004019630 published May 4, 2005.

English Translation of Abstract of DE102004061223 published Aug. 17, 2006.

* cited by examiner

POWER SUPPLY SYSTEMS

The present invention relates to power supply systems and in particular to systems which use an internal combustion engine to drive an electric generator.

It is known, for example in hybrid vehicle powertrain systems, to use a conventional multi-cylinder internal combustion engine to drive an electric generator. However, because in such systems the internal combustion engine uses a slider-crank mechanism, there are, as is known in the art, large piston-cylinder side wall forces and corresponding losses due to piston-cylinder friction.

It is also known to use single-cylinder engines to drive electric generators, as they allow for a reduction in the friction losses associated with multi-cylinder engines. An exemplary known single-cylinder engine and generator arrangement is shown in FIG. 1. This engine comprises a fixed cylinder 1 and a free piston 2. In the arrangement, the piston 2 is connected, via a piston rod 3, to a linear electromagnetic motor-generator 4, and its motion is controlled by appropriately controlling the motor-generator 4. This device thus avoids the problem of the relatively large piston-cylinder side wall forces associated with slider-crank mechanisms.

A further known energy converter that comprises a single-cylinder engine and generator arrangement (in a similar manner to that shown in FIG. 1) is disclosed in WO 01/58211. In this energy converter, the motor-generator (armature) is connected via a spring to the housing that encases the device. As will be appreciated by those skilled in the art, in use, the spring causes the motor-generator (armature), in combination with the piston and piston rod (which are connected to the armature as shown in FIG. 1), to oscillate at a particular frequency, i.e. the natural frequency of the oscillating system. This device therefore allows an electric current with a fixed frequency, which corresponds to the natural frequency of the system, to be easily generated.

In such reciprocating engine driven systems (e.g., that shown in FIG. 1 and that disclosed in WO 01/58211), however, due to their very nature, the relative speed between the moving and static parts of the motor-generator arrangement (and which is a key factor in determining the amount of energy that can be generated) is fixed by the speed of the piston, thereby restricting the practical applications where such systems can be used.

The Applicants accordingly believe that there remains scope for improvements to power supply systems that use an internal combustion engine to drive an electric generator.

According to a first aspect of the present invention, there is provided a power supply system, comprising:

an internal combustion engine having a piston-cylinder assembly in which:

the piston and cylinder are each arranged to be rotatable in use about a common axis of rotation and are further arranged such that combustion in the combustion chamber formed between the cylinder and piston can cause the piston and cylinder to oscillate relative to each other about their common rotational axis; and in which:

the piston and cylinder are further arranged to form a mass-elastic system that is capable of resonance; the system further comprising:

an electric generator arrangement coupled to the piston-cylinder assembly for generating an electrical output from the motion of the piston and/or cylinder in use.

According to a second aspect of the present invention, there is provided a method of generating an electrical output using an internal combustion engine having a piston-cylinder assembly in which the piston and cylinder are each arranged to be rotatable in use about a common axis of rotation and are further arranged such that combustion in the combustion chamber formed between the cylinder and piston can cause the piston and cylinder to oscillate relative to each other about their common rotational axis, and in which the piston and cylinder are further arranged to form a mass-elastic system that is capable of resonance, the method comprising:

using combustion in the combustion chamber formed by the piston and cylinder to cause relative oscillatory motion of the piston and cylinder about their common rotational axis; and coupling the piston-cylinder assembly to a generator arrangement so as to generate an electrical output from the motion of the piston and cylinder.

The present invention comprises an internal combustion engine that is coupled to a generator arrangement and which can be used to drive the generator arrangement so as to generate an electrical output.

However, in the present invention, unlike in prior art systems that use internal combustion engines to drive an electric generator, the internal combustion engine comprises a piston-cylinder assembly having a piston and cylinder that are both able to rotate about a common (shared) axis of rotation.

By allowing both the piston and cylinder to be rotatable about the rotational axis, rather than one of these components being fixed, their relative motion in use can more readily be dynamically balanced, such that the engine can more readily be configured to produce a zero external torque without the need for further components, e.g. counterweights, to be used, even in single-cylinder configurations. Moreover, because the motion of the piston and cylinder is rotational, rather than linear, this facilitates the provision of a more compact, but still dynamically balanced, engine.

The piston and cylinder are further arranged to oscillate with respect to each other about their common axis of rotation in use (i.e. such that there can be and is relative angular motion between the piston and cylinder about the axis of rotation in use).

In other words, during combustion when the piston, for example, moves in a clockwise direction about the rotational axis, the cylinder, at the same time, can move in an anticlockwise direction about the axis relative to the piston (or vice-versa). This relative oscillation provides the relative (angular) motion of the piston and cylinder that is necessary for the operation of the internal combustion engine (i.e. allows the piston and cylinder together to form a combustion chamber having a variable volume in which fuel can be combusted in use to drive the piston and cylinder (engine)).

In a preferred embodiment, as will be discussed further below, the piston and cylinder both rotate completely (spin) about their common axis with a common mean angular velocity, and the relative oscillatory motion between the piston and cylinder is superimposed upon this common, unidirectional rotation. In such arrangements, although both the piston and cylinder will both rotate in the same direction overall, e.g. in a clockwise or anticlockwise direction, the absolute angular velocity of each of the piston and cylinder in that direction will differ relative to each other over time (due to their relative oscillatory motion), such that the variable volume combustion chamber is still formed.

The piston and cylinder in the system of the present invention are additionally arranged to form a mass-elastic system, which at its simplest level can be described mathematically by two discrete masses connected by an elastic spring. The mass-elastic system should be capable of resonance, i.e. it has at least one natural frequency at which resonance (amplified oscillatory motion) occurs. The provision of a system that can resonate in use facilitates, inter alia, and as will be discussed further below, more efficient and effective generation of electricity using the system.

The piston and cylinder can be arranged to form such a mass-elastic system in any suitable and desired manner. For example, in a preferred embodiment, the piston and cylinder each engage (in use) one or more resilient (elastic) members, e.g., and preferably, one or more springs (e.g. helical springs, torsion springs or the like), for this purpose.

Thus, in a particularly preferred embodiment, the piston and cylinder each engage (or are arranged to engage in use) one or more resilient members, e.g., and preferably, one or more springs, such that they can oscillate (resonant) relative to each other about their common rotational axis. In other words, in a preferred embodiment, the mass-elastic system comprises the piston and cylinder and one or more resilient (elastic) members, such as springs, arranged such that the piston and cylinder can (and will) elastically oscillate relative to each other (via the action of the resilient member(s)) in use.

The piston and cylinder may, in some embodiments, directly engage (be coupled to) the one or more resilient members. Alternatively, and as discussed in more detail below, the piston and cylinder may (indirectly) engage the one or more resilient members, for example, via means for supporting the piston and/or cylinder.

In one embodiment, the piston engages (is coupled to) one resilient member, e.g. spring, and the cylinder engages another (different) resilient member, e.g. spring, such that they will elastically oscillate relative to each other (in use).

In other embodiments, the piston and cylinder engage (are coupled to) the same resilient member or members (e.g. spring or springs), such that they will oscillate relative to each other (in use). For example, the piston and cylinder may be coupled to each other (mutually restrained relative to each other) by a resilient (elastic) coupling, such as by being joined to each other by, or by each respectively engaging (in use), a resilient (elastic) member or members arranged between respective parts of the piston and cylinder (assemblies).

Thus, in a particularly preferred embodiment, the piston and cylinder are coupled to each other using, and/or engage (in use), one or more resilient members, e.g., and preferably, one or more springs, so as to form the mass-elastic system.

The piston and cylinder can be, and in some embodiments are, arranged in a mass-elastic system using one or more helical springs. However, as will be appreciated by those skilled in the art, such springs can stretch radially when, and as discussed in more detail below, the piston and cylinder are rotating (spinning) in use, thereby resulting in unwanted friction forces. Accordingly, in particularly preferred embodiments, the piston and cylinder are instead arranged in a mass-elastic system using one or more torsion springs, which do not experience (are not susceptible to) the same problems in use.

Thus, in a particularly preferred embodiment, the piston and cylinder are coupled to each other (directly or indirectly) by one or more torsion springs such that they can oscillate (resonant) relative to each other about their common rotational axis.

In other less preferred embodiments, a circumferentially extending resilient (elastic) member or members (e.g. helical spring or springs) is or are arranged at, and/or between, respective ends of the piston and cylinder arrangements, so as to form the required mass-elastic system. In this case the ends of the cylinder and piston that are not internal of the combustion chamber preferably (each) engage (and are preferably connected to) a resilient member (spring).

In another less preferred embodiment, respective springs of a pair of pre-compressed (helical) springs could be arranged to engage the respective ends of the piston and cylinder, such that if the piston and cylinder were disturbed, the effect of the springs would be to cause oscillation about a relative equilibrium position.

The piston cylinder mass-elastic system arrangement should be such that combustion in the cylinder can cause the system (the piston and cylinder) to resonate (i.e. such that under the action of the periodic gas pressures from (appropriate) combustion, resonance (i.e. an amplified relative oscillatory motion between the piston and cylinder) occurs).

The arrangement of the mass-elastic system is preferably such that the piston and cylinder are (elastically) restrained about a relative (angular) equilibrium displacement and form a mass-elastic system with a definite natural frequency. The angular equilibrium position is preferably set part-way between "top-dead-centre" and "bottom-dead-centre", and preferably such that under normal resonance of the system, the stroke lies precisely between top-dead-centre and bottom-dead-centre.

Subject to their relative resilient constraint to each other to form the resonant mass-elastic system as discussed above, the piston and cylinder are otherwise preferably both able to orbit (spin) about their axis of rotation. This allows a given "spin" to be imposed on the piston and cylinder in addition to their angular oscillation (resonance), which can be advantageous in terms of electricity generation, as will be discussed further below. Thus, in a particularly preferred embodiment, the piston and cylinder are each able to orbit (spin) about their axis of rotation (and preferably in both a clockwise and an anti-clockwise direction).

In a particularly preferred embodiment, the piston and cylinder can rotate (spin) together (in common) about their axis of rotation, with their relative oscillatory motion then being superposed on the mean angular velocity of that common rotation (spinning). In other words, the piston and cylinder can preferably, save for in respect of their relative oscillatory motion, be arranged to rotate, and can rotate, about the axis of rotation as if "locked" together as one system. Thus, in a preferred embodiment, the piston and cylinder can rotate (spin) together with a common mean angular velocity about the axis of rotation in use (with their relative oscillatory motion (resonance) then being superposed on top of that common rotation).

In a particularly preferred embodiment, neither the piston and nor the cylinder are (mechanically) constrained or fixed relative to their axis of rotation. In other words, save for their motion being constrained relative to each other by the resilient coupling to form the mass-elastic system as discussed above, the piston and cylinder are preferably each, in themselves, capable of rotating (spinning) completely freely about their axis of rotation. This has the advantage that a dynamically balanced system can be more readily obtained, and there can, for example, be zero net torque about the axis of rotation in use.

Thus, in a particularly preferred embodiment, the piston and cylinder are both capable of rotating freely about their axis of rotation. Similarly, it is preferred that the only mechanical constraint to the rotational movement of the piston and cylinder is any mechanical constraint on their motion relative to each other, such as the limitation imposed due to their mating arrangement to form the combustion chamber and any elastic coupling required to form the mass-elastic system.

The piston and cylinder may be formed and arranged in any desired and suitable manner. As will be appreciated by those skilled in the art, they will need to co-operate (mate) in use so as to form a variable volume combustion chamber through their relative rotational motion. However, subject to this requirement, they can otherwise be constructed as desired.

In a particularly preferred embodiment, the piston and cylinder are each formed as corresponding toroidal sections (that will accordingly mate with each other to form a combustion chamber in use). The use of a piston-cylinder assembly comprising a mating toroidal-section shaped piston and cylinder can allow the use of state-of-the-art combustion techniques, and can avoid combustion-chamber sealing problems commonly found with conventional rotary piston-cylinder assemblies (such as the Wankel engine).

The piston and cylinder may similarly be supported and arranged to rotate and oscillate about their common axis of rotation in any desired and suitable manner. In a preferred embodiment, they are each supported on a support (or between a plurality of supports) that is (are) arranged to rotate (be rotatable) about their common axis of rotation. In this case, rotation of the supports provides rotation of the cylinder and piston.

Thus, in a particularly preferred embodiment, the piston is mounted on a support that is able to rotate about a rotational axis, and the cylinder is mounted on another support (its own support) that can rotate about the axis. Preferably the supports are (rotatably) mounted on a common axle (which then forms the axis of rotation). As discussed above, the supports are preferably free to rotate about the axis of rotation, and are not mechanically constrained or fixed relative to the axis of rotation (their axle).

The supports for the piston and cylinder can take any suitable and desired form, but in a preferred embodiment comprise discs.

For example, in one preferred embodiment, the engine comprises a cylinder mounted on a supporting disc or on a plurality of supporting discs and a piston mounted on a supporting disc (that is separate to the disc that supports the cylinder), with both discs being mounted on, and able to rotate about, a common axle (and such that the piston and cylinder will mate with each other in use to form a combustion chamber). In such an embodiment, the piston and cylinder are preferably mounted on the facing (internal) surfaces of the supports.

In a particularly preferred embodiment, the engine comprises a cylinder mounted between two supporting discs and a piston mounted on a supporting disc that is separate to, and between, the two discs that support the cylinder. All three discs are mounted on, and able to rotate about, a common axle (and such that the piston and cylinder will mate with each other in use to form a combustion chamber). (As will be appreciated, since the two discs are connected by the cylinder (in order to support the cylinder), they essentially comprise a single unit (moving part).)

In this latter embodiment, the piston and cylinder are arranged in a mass-elastic system preferably by coupling one of the discs that supports the cylinder and the disc that supports the piston by a first resilient member, and coupling the other one of the discs that supports the cylinder and the disc that supports the piston by a second resilient member. The first and/or second resilient members preferably comprise a torsion spring (mounted about the common axle), and more preferably a machined torsion spring that possess the desired dimension, pitch and spring characteristic.

The use of two torsion springs in the above embodiment, as will appreciated by those skilled in the art, allows any axial forces that typically would be generated by a single torsion spring to be avoided. For example, and in a particularly preferred embodiment, the first resilient member comprises a torsion spring having a first pitch and the second resilient member comprises a torsion spring having a second, opposing, pitch. Therefore, any axial (unbalancing) force that may be generated by the torsion spring forming the first resilient member is cancelled out by an opposing (equal and opposite) axial force generated by the torsion spring forming the second resilient member.

The piston and cylinder can be attached to their respective supports (e.g. discs) in any suitable and desired manner. For example, the piston and cylinder can be integrally formed with their supports and/or fixedly mounted to their supports using mechanical means, etc. In one preferred embodiment, the piston and cylinder are tangentially mounted on their respective supports.

The piston and cylinder, together with their associated supports (e.g. discs) where appropriate, are preferably arranged and/or constructed to have substantially equal, and preferably exactly equal, mass distributions. This helps to ensure that the engine is dynamically balanced in use, thereby avoiding potentially harmful out-of-balance (inertia) forces and moments. This can then avoid the need to use further components such as counterweights to dynamically balance the engine, thereby increasing the power to weight ratio of the engine.

In a preferred embodiment, the piston-cylinder assembly further comprises restraining means to restrain and preferably prevent the possibility of a collision, between the (longitudinal) ends (end surfaces) of the piston and cylinder in use. This is desirable because such collisions could cause damage to the piston and/or cylinder, and/or a reduction in the efficiency of the engine.

Thus, in a preferred embodiment, the motion of the piston and cylinder relative to each other is constrained to reduce, and, preferably, prevent, collisions between the ends of the piston and cylinder in use. These restraining means can take any suitable and desired form. For example, the resilient member (e.g. spring) coupling the piston and cylinder to form the mass-elastic system can also be used and/or configured, to restrain or prevent colliding motion of the piston and cylinder.

In a preferred embodiment, the piston-cylinder assembly includes for this purpose an annular spigot and a blind air-filled dummy cylinder that co-operate in use to cushion and, preferably, prevent collisions between the ends of the piston and cylinder in use.

As will be appreciated by those skilled in the art, the internal combustion engine will need to include suitable means for transferring and/or injecting fuel and air into the chamber of the piston-cylinder assembly in use, and, similarly, suitable means for transferring and/or extracting exhaust gases resulting from combustion from the piston-cylinder assembly in use.

This can be achieved in any desired and suitable manner, for example by using one or more suitable inlet and exhaust valves, and, e.g., a pump for injecting fuel and/or air into the combustion chamber.

Conventional poppet valves with straight stems could, for example, be used. Preferably, however, the valves are arranged such that their motion in use (as they open and close) is along (part of) an arc that surrounds the common rotational axis of the piston and cylinder. This may be, and is preferably, achieved by the valves having (appropriately) curved stems and being arranged to be rotatable about the common rotational axis of the piston and cylinder in use. Accordingly, the valves, in use, will be moved between first (open) angular positions and second (closed) angular positions by rotary motion of the stem about the rotational axis (in effect, the valves will lift and close in a circular orbital motion (along an arc rather than along a chord)). This embodiment is advantageous in that it allows for the engine to remain dynamically balanced even during valve operation (during the opening and closing of the valves).

There will also be, e.g., suitable spark plug arrangements and controls (a controller) for controlling operation of the engine in use.

These various elements may be, e.g., and preferably are, suitably mounted or coupled to the supports for the piston and cylinder, if desired.

The internal combustion engine in the present invention could comprise a plurality of piston-cylinder assemblies, with, e.g., each assembly being mounted on the same, common axle (axis of rotation). However, in a preferred embodiment it is a single cylinder engine.

The electric generator arrangement of the system of the present invention can be arranged and constructed as desired so as to generate electricity from the motion of the piston and/or cylinder.

As will be appreciated from the above, the electricity will be generated from the rotational motion of the piston and/or cylinder (i.e. the rotating piston and cylinder will form the rotor part of the generator) and so there will need to be a fixed stator that the piston and cylinder of the piston-cylinder assembly can move relative to.

Such a stator can be provided as desired, but in a preferred embodiment is provided on or in a fixed casing of the system, that surrounds, at least in part, the outer circumference of the piston and/or cylinder. Thus, in a preferred embodiment, the piston-cylinder assembly (the internal combustion engine) includes, and preferably is contained within, a fixed casing to which, inter alia, the stator of the generator is mounted.

The necessary magnetic flux generating means and conductors (windings) of the generator can be mounted on the stator or rotor of the generator, respectively, as desired. For example, the magnet flux generating means (which may be in the form of electromagnets or permanent magnets, etc.) may be mounted on the fixed casing of the system so as to at least partially surround the rotating piston and cylinder assembly, thereby forming a stator part of the generator, and the piston and/or cylinder (and preferably both) and/or their supports could carry the conductors of the generator arrangement, or vice-versa.

In a particularly preferred embodiment, there is a separate generator part (arrangement) for each of the piston and cylinder of the piston-cylinder assembly. In other words, the generator arrangement preferably comprises two (twin) generator parts (arrangements), one for (in respect of) the piston, and one for (in respect of) the cylinder, which parts can preferably be operated independently of each other. In this case the piston and cylinder will, e.g., and preferably, each have their own respective stator arrangements. Having separate generator arrangements for the cylinder and piston facilitates operating and using the cylinder and piston independently of each other, particularly where the generator arrangements are also used for motoring control of the piston and cylinder (as will be discussed further below).

In a particularly preferred embodiment, the generator arrangement (and both or all parts of the generator arrangement where there are separate generator parts (arrangements) for the piston and cylinder) can also be operated as a motor, i.e. be used to drive the rotational movement of the piston and/or cylinder (and preferably both), in addition to being used to generate electricity from the motion of the piston and cylinder assembly. In the "motoring" case, an electric current will be applied to the conductors of the generator to induce movement of the piston and/or cylinder relative to the stator of the generator (i.e. about the axis of rotation) as is known in the art.

As will be discussed further below, the ability to drive the piston-cylinder assembly using the "generator" arrangement can provide significant advantages in terms of controlling the operation of the overall system.

Thus, in a particularly preferred embodiment, the system of the present invention comprises a motor-generator arrangement that can be used to generate electricity from the motion of the piston and/or cylinder, and that can be used to drive and/or control rotational motion of the piston and/or cylinder. (The term "motor-generator" is used herein to mean an arrangement that can be used either as an electric motor or as a generator.)

Similarly, in a particularly preferred embodiment, the piston and cylinder each have their own, independent, motor-generator arrangements. This would then allow, e.g., independent "motoring" control of the piston and cylinder in use. Indeed, it is preferred that the piston and cylinder can be motored (controlled) independently of each other in use.

As will be appreciated by those skilled in the art, the generator or motor-generator arrangement will also include appropriate electrical connections, controllers, etc., to allow the generated electricity to be provided to a load, such as a battery to be charged, and/or an electric appliance, etc., and to provide controlled motoring of the piston and cylinder assembly (where provided).

As will be appreciated from the above, the basic operation of the system of the present invention will be to cause and use relative motion between the rotor part (the piston and/or cylinder and/or their respective supports (e.g. discs)) and the stator part (or parts) of the generator arrangement to generate electricity.

In use, the output electrical energy will, in effect, be generated by the relative oscillation (resonance) between the piston and cylinder (in fact by the relative oscillation between the piston and/or cylinder and the stator of the generator that is a consequence of the relative oscillation of the piston and cylinder) that is caused by combustion in the chamber formed by the piston and cylinder. In effect, periodic combustion in the combustion chamber of the piston-cylinder assembly will be used to drive oscillation (resonance) of the piston and cylinder, and thereby generate output electrical energy. The Applicants have found that, in preferred embodiments of the present invention at least, the output electrical energy generated by this can, on average, equal the work done by the expanding combustion gases.

Thus, in a particularly preferred embodiment, in use of the system of the present invention, periodic combustion in the piston and cylinder assembly is used drive relative oscillation (and preferably resonance) between the piston and cylinder (and thereby to generate electricity), and the arrangement is such that periodic combustion in the combustion chamber formed by the piston and cylinder can cause (drive) relative oscillatory motion (and preferably resonant motion) between the piston and cylinder.

Most preferably, the piston and cylinder assembly is driven in use to cause resonant relative oscillation (resonance) between the piston and cylinder. The use of appropriately controlled resonance of the piston and cylinder can facilitate the use of significantly lower control torques (this is discussed further below), and lower magnetic flux densities for a given level of electrical power generation, as compared, e.g., to linear arrangements such as that shown in FIG. 1.

The ability to use lower magnetic flux densities also means that there is less need to, or there can be no need to, use higher strength magnets (which can often be expensive and can introduce a number of safety issues), and can reduce the level of any peak currents that may be induced in use (which is safer and reduces any losses associated with such currents).

It would be possible for the piston and cylinder's only motion in use to be their relative oscillatory motion and resonance (i.e. for them to have zero overall (net) angular velocity).

However, in a particularly preferred embodiment, the piston and cylinder are arranged to rotate together at a given mean angular velocity, with their relative oscillation (resonance) then being superposed on that common mean angular velocity. Thus, in a particularly preferred embodiment, the piston and cylinder have a common, preferably selected, spin relative to the stator, in addition to their angular oscillation (resonance).

Thus, in a particularly preferred embodiment the piston and cylinder are arranged, in use, to rotate (spin) about their axis of rotation at a given common (mean) angular velocity, with relative oscillation (resonance) between the piston and cylinder being superposed on that common angular velocity. In other words, the piston and cylinder will both rotate in the same direction overall (e.g. clockwise or anticlockwise) with the same, non-zero, mean angular velocity in that direction, but they will relatively accelerate away from and towards each other whilst doing so as they oscillate (and thus their absolute angular velocity changes) relative to each other. Thus, in these arrangements, the absolute angular velocity of the piston and cylinder will be positive, but not constant.

This provides a number of advantages. For example, an advantage of spinning the piston and cylinder together at a common mean angular velocity is that a much higher absolute angular velocity relative to the stator part or parts of the generator can be achieved. This facilitates more efficient and effective electricity generation. This is because the electrical power is generated by the absolute rotation of the piston and/or cylinder, and so imposing a higher absolute rotation (spin) allows more effective electrical power generation.

A further advantage is that the absolute angular velocity of the generator system can be set independently of the combustion operation (requirements) such that, for example, the generator efficiency can be optimised independently of the combustion efficiency requirements.

Indeed, it is an important advantage of a rotary arrangement that the piston and cylinder can be rotated together in this fashion in addition to the relative motion caused by combustion.

Moreover, the Applicants believe that a power supply system comprising an internal combustion engine having a piston-cylinder assembly in which the piston and cylinder can both oscillate relative to each other and can spin together at a greater than zero common mean angular velocity may be new and advantageous in its own right, and not just in the context of a resonant, e.g., dynamically-balanced, system. This is because, for example, spinning the piston and cylinder at a common, positive mean angular velocity will as discussed above, facilitate more efficient and effective electricity generation in any event.

Thus, according to a third aspect of the present invention there is provided a power supply system, comprising:

an internal combustion engine having a piston-cylinder assembly in which:

the piston and cylinder can be rotated together in use at a common mean annular velocity about a common axis of rotation and are further arranged such that combustion in the combustion chamber formed between the cylinder and piston can cause the piston and cylinder to oscillate relative to each other about their common rotational axis when so-rotating.

According to a fourth aspect of the present invention, there is provided a method of operating an internal combustion engine having a piston-cylinder assembly in which the piston and cylinder are each arranged to be rotatable in use about a common axis of rotation and are further arranged such that combustion in the combustion chamber formed between the cylinder and piston can cause the piston and cylinder to oscillate relative to each other about their common rotational axis, the method comprising:

rotating the piston and cylinder about their common rotational axis to or at a non-zero common mean angular velocity; and using combustion in the combustion chamber formed by the piston and cylinder to cause relative oscillatory motion of the piston and cylinder about their common rotational axis as the piston and cylinder rotate.

As will be appreciated by those skilled in the art, these aspects of the present invention can and preferably do include any one or more or all of the preferred and optional features of the invention described herein, as appropriate. Thus, for example, the piston and cylinder assembly is preferably arranged as a mass-elastic system that is capable of resonance, and/or is preferably coupled to a generator assembly so as to generate an electrical output from the motion of the piston and/or cylinder.

The non-zero (greater than zero) common angular velocity in these aspects and embodiments of the invention is preferably predetermined, and will typically be selected based on the specific use of the internal combustion engine. In one preferred embodiment, the piston and cylinder are rotated (spun) in common at an angular velocity of about 2000 rpm.

The above motion of the piston and cylinder arrangement can be achieved, in use in any suitable and desired manner.

Where the piston and cylinder each spin at common (mean) angular velocity, then they are preferably each accelerated to their greater than zero angular velocity prior to any combustion operations being performed, and indeed also preferably prior to the initiation of any oscillatory motion of the piston and cylinder.

Accordingly, the present invention preferably comprises means for or a step of rotationally accelerating the piston and cylinder about their common rotational axis to a, preferably predetermined, greater than zero common angular velocity, preferably prior to the initiation of any combustion events, and preferably prior to the initiation of any oscillatory motion of the piston and cylinder.

The piston and cylinder can be accelerated (spun) in this way by any suitable means. In a preferred embodiment the piston and cylinder are so-accelerated (spun) by operating the generator in its "motoring" mode of operation (where possible) (i.e. by applying an electrical current to the conducting elements of the generator so as to induce a torque on the piston and/or cylinder, thereby causing the piston and cylinder to move relative to the fixed stator).

The relative oscillatory motion between the piston and cylinder can similarly be caused in any suitable and desired manner. For example, it could be started by combustion in the combustion chamber. However, in a preferred embodiment the oscillatory motion is started by operating the generator in its "motoring mode" of operation, before combustion is commenced. In this case, a torque will be induced or applied on one of the piston and cylinder, and, preferably, at the same time, an opposite (preferably an equal, but opposite), torque is induced or applied on the other of the piston and cylinder, by the electric motor arrangement, so as to cause the piston and cylinder to move and oscillate relative to each other.

Accordingly, in a preferred embodiment of the present invention, there is provided means for or a step of inducing or applying torques to the piston and cylinder (preferably inducing or applying a torque on one of the piston and cylinder, and simultaneously, inducing or applying an equal and opposite torque on the other of the piston and cylinder), so as to drive relative oscillation of the piston and cylinder.

As discussed above, this is preferably done prior to initiation of any combustion events and preferably after the piston and cylinder have been set spinning at a common angular velocity.

As discussed above, in operation of the system of the present invention, combustion in the combustion chamber formed by the piston and cylinder will be used to drive relative oscillation of the piston and cylinder. The combustion events will cause the piston and cylinder, due to their arrangement in a mass-elastic system, to oscillate relative to each other about their common axis.

Any suitable combustion arrangement and cycle, such as a 4-stroke or a 2-stroke cycle, can be used for this purpose.

As discussed above, the combustion is preferably only started after the piston and cylinder have already been set oscillating, and, most preferably, after they have been set spinning as well. In other words, combustion is preferably used to drive the system after it has been started, i.e. after it has reached, and is in, its "steady state" condition.

As discussed above, the combustion process is preferably controlled (e.g. by controlling injection and/or ignition timings, etc.) so as to cause the piston and cylinder to resonate (i.e. to oscillate substantially at a natural frequency of their mass-elastic system such that the relative oscillatory motion of the piston and cylinder will be amplified). This is possible because, as discussed above, the mass-elastic system formed by the piston and cylinder is capable of resonance at one or more, preferably predetermined or predefined, natural frequencies.

In order to generate and drive such resonance, the combustion process is preferably controlled such that there will be appropriate periodic combustion events that will drive and maintain the resonance. Thus, in a preferred embodiment, the present invention comprises means for or steps of generating periodic combustion in the piston and cylinder assembly so as to generate relative oscillation, and preferably resonant oscillation, between the piston and cylinder. The periodic combustion is preferably at the same frequency as the natural (resonant) frequency of the piston-cylinder mass-elastic system.

In a particularly preferred embodiment, the present invention further comprises steps of or means for applying controlling damping (torques) to the moving piston and/or cylinder in use. This may be desirable, e.g., to control and avoid excessive resonance build up in use.

Thus, in a preferred embodiment further control over the oscillatory motion of the piston and/or cylinder is provided and effected by damping the motion of the piston and/or cylinder resulting from the combustion process, e.g., and preferably, by inducing or applying a torque that opposes the motion of the piston and/or cylinder resulting from the combustion process. In an embodiment, equal, albeit opposite, oscillatory control (damping) torques are applied to the piston and cylinder in use (for this purpose).

It should be noted here that such "control" torques and damping are intended to be different to (and in addition to) any inherent damping effects due, for example, to friction (which would not be "controlled" or "controllable" in any event, and will, in any event, generally be negligible when compared to the additional, controlled damping deliberately applied to the piston and/or cylinder).

Accordingly, in a preferred embodiment of the present invention, there is provided means for or a step of inducing and/or applying a torque on the piston and/or a torque on the cylinder that opposes the motion of the piston and/or cylinder, respectively (e.g., and preferably to oppose the motion resulting from combustion). In other words, a control torque can be, and preferably is, applied to the piston and/or cylinder, e.g., and preferably, to limit and control the motion of the piston and/or cylinder, respectively (and preferably to control and limit the amplified oscillatory motion caused by combustion in the combustion chamber).

Most preferably, the motion of the piston can be controlled (damped) independently of the motion of the cylinder, and vice-versa. In other words, preferably separate control torques (damping) can be applied to each of the piston and cylinder.

The control torque(s) and damping can be caused and effected in any suitable and desired manner. In a particularly preferred embodiment, any control torque(s) and damping is caused and effected by operating the generator in its "motoring mode" of operation, i.e. by applying a suitable electrical current to the conducting elements of the generator associated with the piston, and/or cylinder, as appropriate.

In a preferred embodiment, the control torque(s) and damping is controlled based on one or more parameters of the oscillatory motion of the piston and/or cylinder (e.g. based on the angular velocity of the piston and/or cylinder) and/or on one or more parameters of the combustion process. For example, as the skilled person will understand, pressures in the combustion chamber due to combustion may vary with each combustion cycle. Preferably, therefore, the damping (control torque) is controlled to take account of this variability in the pressures in the combustion chamber. Preferably the control torque(s) are based on, and preferably follow closely, a velocity feedback strategy.

In a particularly preferred embodiment, an alternating control torque is applied to each of the piston and cylinder that is phase controlled with respect to the frequency of the combustion process (the gas pressure excitation process). Most preferably it is phase controlled with respect to the first harmonic of the combustion process.

The power supply system of the present invention can be applied to any suitable power supply, e.g., vehicle and/or engine, arrangement.

In a particularly preferred embodiment, however, it forms part of a hybrid powertrain system in which the electrical output of the present invention is used in conjunction with a further motor-generator arrangement for generating a mechanical output. In other words, the output from the generator arrangement of the system of the present invention is preferably coupled to and used to drive an electric motor for generating a mechanical output (e.g., and preferably, for driving a vehicle).

The powertrain system that the present invention is used in preferably further comprises a means for storing electrical energy that is generated, such as, for example a battery. The stored energy may then be used, for example, to power electrical units or systems external to the powertrain. Thus, the output from the generator arrangement of the system of the present invention can be, and preferably is, coupled to and used to charge a battery or similar store for storing electrical energy.

In a particularly preferred embodiment of the present invention in which the piston and cylinder can both rotate (spin) completely about their common rotational axis, the piston-cylinder assembly can itself act as, and preferably is used as, an energy store. In this case, the piston-cylinder assembly would, effectively, be spun as, and act as, a flywheel so as to store kinetic energy. This energy could then, e.g., and preferably, be recovered as electrical energy through the generator action of the system of the present invention. In this case, the flywheel operation could, e.g., in a vehicle, be used as part of a regenerative braking system (a kinetic energy recovery and storage system (KERS)). Indeed, it is another important advantage of the system of the present invention that it can, in its preferred embodiments at least, be used as a flywheel to store kinetic energy in this manner.

Thus, in a particularly preferred embodiment, the piston and cylinder assembly can be, and preferably is, operated as a flywheel arrangement in use, preferably driven by (and to recover) kinetic energy. Most preferably in these arrangements, kinetic energy to be recovered (e.g. from a vehicle whilst braking) can be used to generate electricity (e.g. in a motor generator arrangement) which is then used to drive (motor) the piston-cylinder assembly so as to spin it as a flywheel, thereby storing the energy as kinetic energy (that can later be recovered as electrical energy by using the piston-cylinder assembly in its "generating" mode).

Indeed, it is believed that an arrangement comprising an internal combustion engine and a motor-generator arrangement which can both generate and be driven by electrical energy may be new and advantageous in its own right since such an arrangement can, for example, as discussed above, provide enhanced control of a generator arrangement and/or be used to operate the system as a flywheel so that energy can be stored for later recovery as electrical energy.

Thus, according to a fifth aspect of the present invention, there is therefore provided a power supply system, comprising:

an internal combustion engine having a piston-cylinder assembly in which the piston and cylinder can be driven to move relative to each other by combustion in a combustion chamber formed between the piston and cylinder; and an electrical generator-motor arrangement coupled to the piston-cylinder assembly for generating an electrical output from the motion of the piston and/or cylinder in use, and which generator-motor arrangement can further be used to drive motion of the piston and/or cylinder in use.

According to a sixth aspect of the present invention, there is provided a method of operating a power supply system having an internal combustion engine having a piston-cylinder assembly in which the piston and cylinder can be driven to move relative to each other by combustion in a combustion chamber formed between the piston and cylinder and an electric motor-generator arrangement coupled to the piston-cylinder assembly, the method comprising:

using combustion in combustion chamber formed between the piston and cylinder to cause the piston and/or cylinder to move relative to each other; and at the same time or at a different time, using the electric motor-generator arrangement to drive motion of the piston and/or cylinder.

As will be appreciated by those skilled in the art, these aspects of the present invention can, and preferably do, include any one or more or all of the preferred and optional features of the invention described herein, as appropriate. Thus, for example, the piston and cylinder are preferably completely rotatable in use about a common axis of rotation, are preferably arranged to oscillate with respect to each other about their common axis of rotation, and are preferably further arranged as a mass-elastic system that is capable of resonance.

Similarly, the piston and cylinder are preferably driven to rotate together as a flywheel by the electric motor so as to thereby store energy. In such embodiments, the piston and cylinder are preferably driven in this manner at a different time from the relative motion caused by combustion in the combustion chamber.

Similarly, when the piston-cylinder assembly is being driven by combustion, the generated motion is preferably used to generate an electrical output via the generator-motor arrangement. Equally, in such an arrangement, the electric motor is preferably used, at least some of the time, to provide a simultaneous driving force on the piston and cylinder (i.e. simultaneously with the motion caused by combustion), e.g., and preferably, to provide control and/or damping of the motion of the piston and/or cylinder caused by combustion, as discussed above.

The power supply system of the present invention may also be used as a stationary power generation unit. For example, it may used in, on or with trains, marine vessels and/or aerospace vehicles.

Other alterations and additions to the system of the present invention would be possible. For example, the generator-motor system is preferably driven through gearing. In this case, the (pair of) motor-generators of the rotating system, rather than being mounted to the piston and cylinder parts, would be driven by the piston and cylinder parts via gearing, e.g., and preferably, via epicyclic gearing. The (pair of) motor generators would still be coupled elastically via the gearing. The effect of using such gearing is that the piston-cylinder torques and speeds can (and will) differ from those of the motor-generators (e.g. the absolute angular velocity of the rotary part of the generator-motor can and will differ from the angular velocity of the piston and/or cylinder). This will allow, for example, the magnitude of any control torques to be reduced. Although the apparent inertia of the geared system will be a dynamic factor to be considered, the overall effect will be that the control torque magnitudes can be further reduced.

As will be appreciated by those skilled in the art, all of the aspects and embodiments of the present invention described herein can and preferably do include any one or more or all of the preferred and optional features of the invention described herein, as appropriate.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods herein described when the program is run on a data-processing system. The invention also extends to a computer software carrier comprising such software which when used to operate a power supply system comprising data processing means causes in conjunction with said data processing means said system to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which FIG. 1 shows schematically a prior art single-cylinder internal combustion engine and associated generator arrangement;

Figure 1:
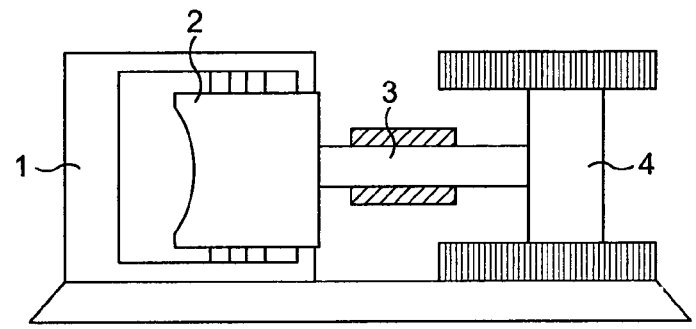
Figure 2:
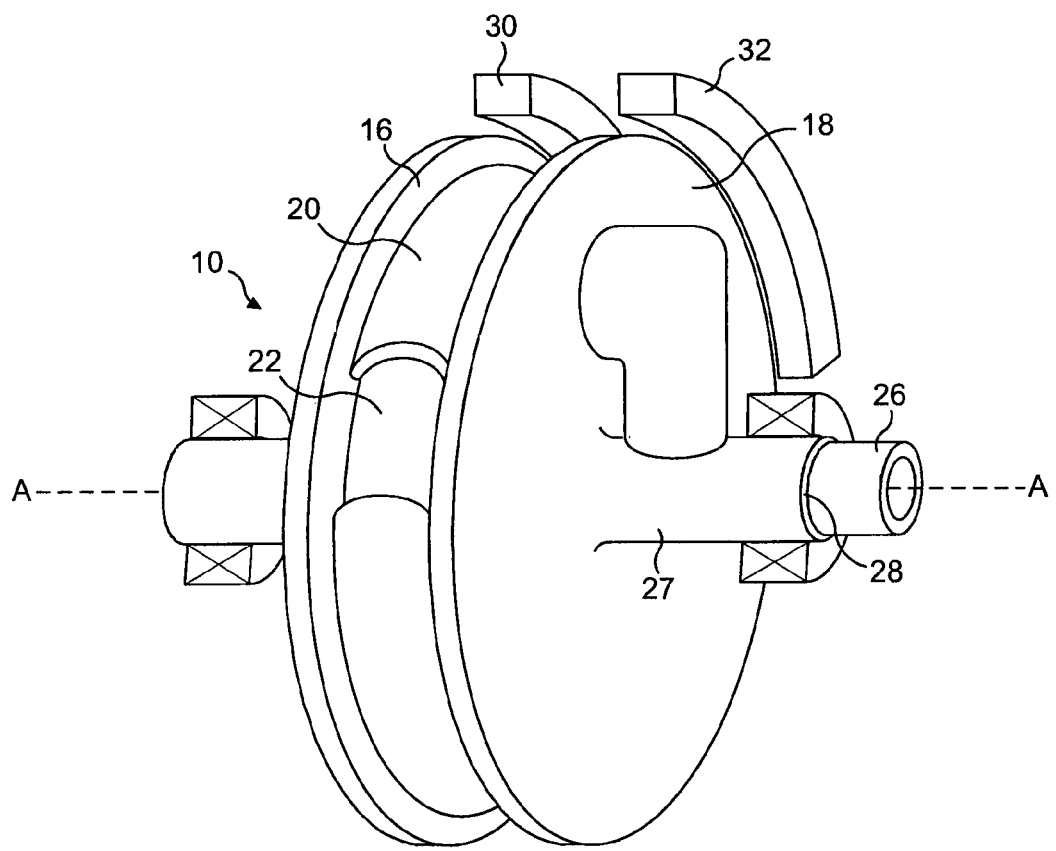
FIG. 2 shows schematically a first embodiment of a power supply system that is in accordance with the present invention.
Figure 2A:
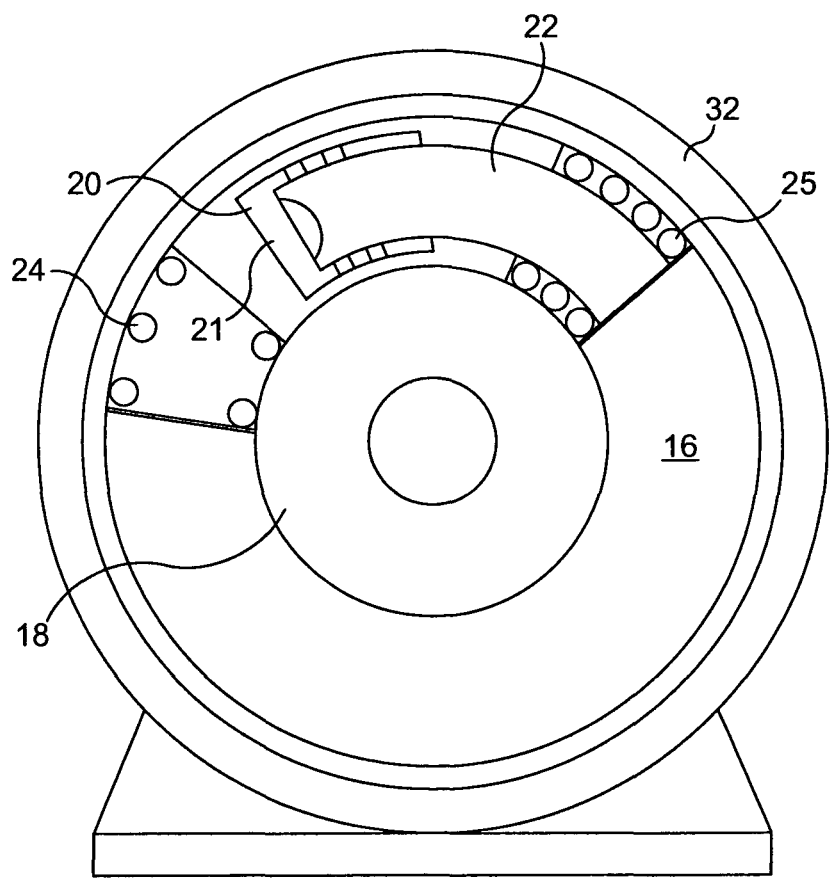
FIG. 2A shows a schematic view of the system shown in FIG. 2 when viewed along the rotation axis A.

A preferred embodiment of a power supply system that is in accordance with the present invention is shown in FIGS. 2 and 2A. As discussed above, the power supply system comprises both an internal combustion engine 10, and an electric motor-generator arrangement that is coupled to the internal combustion engine.

Thus, the power supply system comprises an internal combustion engine 10 that rotates, in use, about an axis A with respect to a stator arrangement 30, 32 of the associated motor-generator arrangement.

The engine 10 has two co-axial discs 16 and 18 mounted on bearings inside the stator housing (not shown). These discs 16, 18 form respective rotor parts of the motor-generator arrangement of the power supply system. Both of the discs 16, 18 are able to rotate completely about the axis A (i.e. they can both spin (orbit) completely (through the full 360°) around the axis A, and neither disc is (mechanically) fixed relative to the axis A).

Each of the discs 16 and 18 is arranged to be dynamically balanced in respect of its rotation by the appropriate distribution of the total mass, so that the net out-of-balance force and external torque on the engine in use can be zero.

A toroidal section-shaped cylinder 20 is mounted to the inside surface of the disc 16, and a mating toroidal section-shaped piston 22 is mounted to the corresponding, facing inside surface of the disc 18. Together, the piston 22 and cylinder 20 form the piston-cylinder assembly of the internal combustion engine 10. In effect, therefore, and as can be seen from FIG. 2, the two discs 16 and 18 house the piston-cylinder arrangement of the engine 10.

As previously discussed, the use of a mating, orbiting toroidal section-shaped piston-cylinder arrangement allows the use of state of the art combustion technologies, and avoids combustion chamber sealing problems that may be experienced with conventional piston-cylinder arrangements.

The piston 22 and cylinder 20 are mutually restrained by a pair of circumferentially extending pre-compressed helical springs 24, 25 about a relative angular equilibrium position, thereby forming a rotary mass-elastic system with a definite natural frequency, i.e. a frequency at which the system will resonate. The relative angular equilibrium position, as can be seen in FIG. 2A, is set between top-dead-centre (TDC) and bottom-dead-centre (BDC), the exact position being dictated by the operational parameters of the engine such that in "normal" operation (as discussed below) the stroke of the engine lies precisely between TDC and BDC.

A chamber 21 is formed between the crown of the piston and the closed end of the cylinder, in which combustion takes place when the engine is in use. Accordingly, the engine is also provided with means for transferring air and fuel to the chamber 21, an ignitor (not shown) and means for expelling exhaust gases from the chamber 21 following combustion (also not shown). In the embodiment of FIG. 2A, a fixed air-intake pipe 26 supplies air to a pipe 28 mounted, integrally or as a separate component, to the disc 18 and extending along the axis A. The pipe 28 therefore rotates with the disc 18, and a sealing relationship is maintained between the fixed pipe 26 and the rotating pipe 27 using a rotating seal 28.

Although not shown, a similar arrangement is used to transfer fuel, either as a liquid or as a gas, to the engine. In a preferred embodiment, the fuel is supplied to a pump mounted on the one of the discs 16 and 18 that, in use, injects the fuel into the chamber 21.

A similar arrangement is used to carry exhaust gases away from the engine. In such arrangements suitable cooling means may be provided on the supporting bearings due to the high temperature of the exhaust gases. The fixed pipe 26 supplying air to the chamber 21 can, at least in some embodiments, be in fluid communication with the fixed pipe transferring the exhaust gases away from the chamber 21. This arrangement would allow for exhaust gases to be recirculated, i.e. exhaust gas recirculation (EGR) to be performed, to thus reduce NOx emissions from the engine as is known in the art.

The supply of air and fuel to the chamber 21, and the extraction of exhaust gases from the chamber, is controlled using inlet and exhaust valves. Such valves can be cam driven, or operated hydraulically, pneumatically or using solenoids, and can in some embodiments be operated with variable-valve-timing (VVT).

Arranged around at least a portion of the circumference of each of the discs 16 and 18 is a stator 30, 32 of the motor generator arrangement. In the embodiment shown in FIG. 2, one stator 30 is associated with the disc 16 and the other stator 32 is associated with the disc 18.

In a preferred embodiment, one or more permanent magnets are provided around the circumference of each of the rotating discs 16 and 18, and a plurality of conducting elements are provided on the associated stators 30, 32. Alternatively, in other embodiments, the one or more permanent magnets can be provided on the inner surface of each of the stators 30 and 32, whilst the conducting elements are provided on the circumferences of the discs 16 and 18.

In either case, and as the skilled person will appreciate, the discs and stators together form a motor-generator arrangement. Therefore, in a "generating" mode of operation, the rotation of the discs 16 and 18 relative to their respective stators 30, 32 induces an electric current in the conducting elements. Conversely, in a "motoring" mode of operation, the discs 16 and 18 can be caused to rotate, by applying an electric current to the conducting elements.

It should be noted here that when, for example, the system is generating electrical power, the external torque generated on the stator (pair) by generator-motor action from the disc 16 and the disc 18 should be equal and opposite, and will therefore sum to zero.

Figure 3:
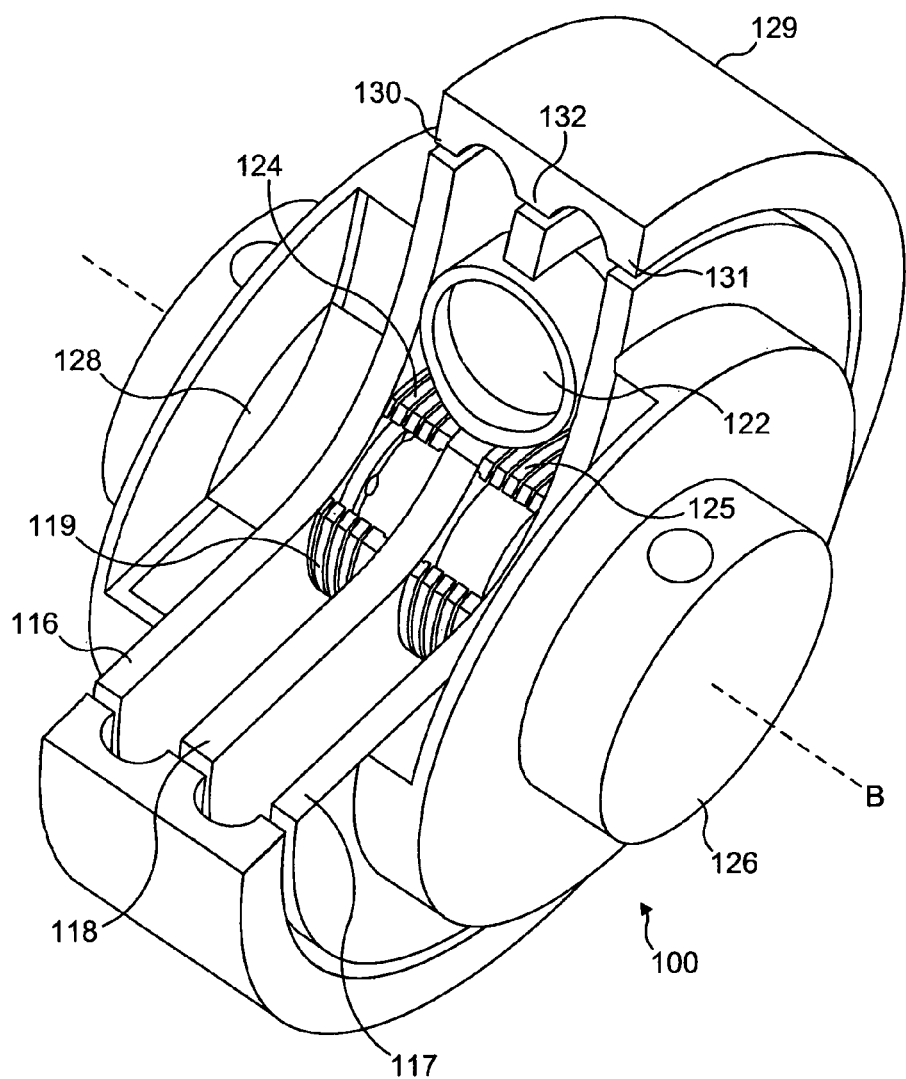
FIG. 3 shows schematically a second embodiment of a power supply system that is in accordance with the present invention.
Figure 3A:
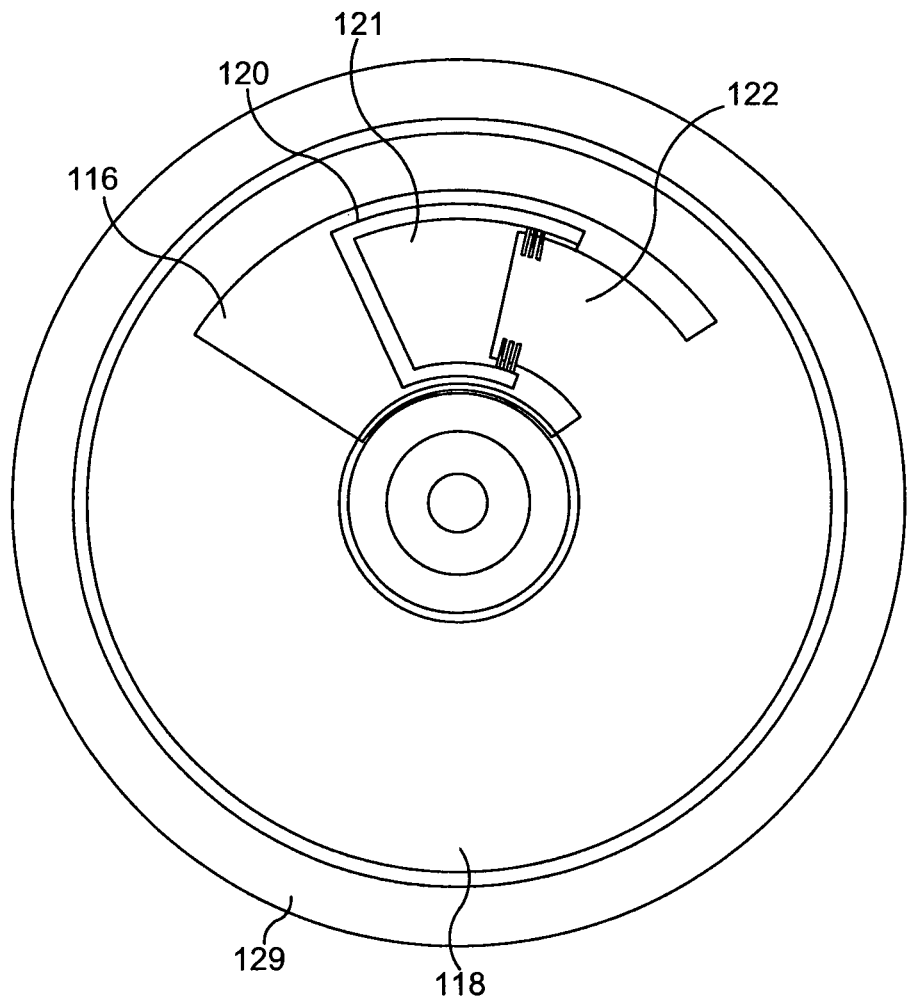
FIG. 3A shows a schematic view of the system shown in FIG. 3 when viewed along the rotation axis B.

A second preferred embodiment of a power supply that is in accordance with the present invention is shown in FIGS. 3 and 3A. This embodiment is similar in many respects to that shown in FIGS. 2 and 2A, but differs in the construction of the rotary elements of the engine and the manner in which the piston and cylinder are formed into a mass-elastic system.

The power supply system shown in FIGS. 3 and 3A comprises an internal combustion engine 100, and an electric motor-generator arrangement that is coupled to the internal combustion engine. The internal combustion engine 100 rotates, in use, about an axis B with respect to a housing 129 that forms the stator of the associated motor-generator arrangement.

The engine 100 has three co-axial discs: outer discs 116, 117 and inner disc 118, which are mounted on bearings 119. A toroidal section-shaped cylinder 120 is mounted between the two outer discs 116, 117 such that the discs and cylinder form a single unit that is able to rotate completely about the axis B. Similarly, a toroidal section-shaped piston 122 is mounted to the inner disc 118, and mates, in use, with the cylinder 120. Together the piston 122 and cylinder 120 form the piston-cylinder arrangement of the internal combustion engine 100.

The piston 122 and the cylinder 120 are arranged in a rotary mass-elastic system by connecting a first machined torsion spring 124 between the outer disc 116 and the inner disc 118, and by connecting a second machined torsion spring 125 between the outer disc 117 and the inner disc 118. The first and second springs 124, 125 are constructed so as to have opposing pitch, therefore meaning that any axial force generated by the first spring 124 is cancelled out by the opposing axial force generated by the second spring 125.

Arranged on the inside surface of the housing 129 are three sets of conducting elements 130, 131 and 132. Each of these conducting elements is associated with one of the three co-axial discs of the engine, which have one or more permanent magnets provided around their circumference. As can be seen from FIG. 3, conducting elements 130 are associated with, and form a stator to, the outer disc 116. Similarly, conducting elements 132 are associated with the inner disc 118, and conducting elements 131 are associated with the outer disc 117.

The rotating elements of the internal combustion engine 100 rotate on a shaft 134 that extends along the axis B, and through which fuel and/or exhaust gases can be transferred to and from the combustion chamber 121 (formed between the crown of the piston and the closed end of the cylinder), and which is in sealing relationship with a static support shaft 126 by way of a seal 128.

The operation of a power supply system in accordance with the present invention will now be described with reference to the first embodiment as shown in FIGS. 2 and 2A. The skilled person will understand, however, that the second embodiment as shown in FIGS. 3 and 3A operate in a similar manner to that described below.

The discs 16 and 18 are initially accelerated to a predetermined angular velocity by "motoring" the discs using the motor-generator. For example, the discs 16 and 18 are accelerated until both discs are rotating, e.g. in a clockwise direction, about the axis A at a predetermined angular velocity. The angular velocity of the discs is chosen so as to allow the motor-generator to operate at its optimum efficiency, and is typically selected to be around 2000 rpm.

The motor-generator is then used to initiate an oscillatory motion between the piston 22 and cylinder 20, which is superimposed on the above described rotation of the discs. This motion is achieved by applying equal, but opposite, torques to the discs 16 and 18. For example, the absolute angular velocity of the disc 18 is increased by the application of a clockwise torque, while, simultaneously, the absolute angular velocity of the disc 16 is decreased by the application of an anti-clockwise torque of equal magnitude.

The engine 10 is able to operate in a 2-stroke cycle or a 4-stroke cycle. For example, when operating in a four-stroke cycle, the piston 22 is initially located at its equilibrium position part-way between TDC and BDC. Equal, but opposite, torques are then applied to the discs 16 and 18 causing the volume of the combustion chamber 21 to increase and for fuel and air to be drawn or injected into the chamber. However, as the motion of the piston 22 and cylinder 20 is restrained by the helical springs 24, 25 (torsion springs 124, 125 in the case of the second embodiment) the motion of the piston and cylinder subsequently reverses thus causing the fuel and air mixture in the chamber to be compressed. Following this compression stroke, the compressed fuel and air mixture is ignited forcing the piston and cylinder to move apart. Finally, and following completion of the combustion stroke, the piston and cylinder again reverse direction and expel the exhaust gases from the chamber 21.

Under the action of the gas pressure from combustion, which is controlled to occur at the natural frequency of the mass-elastic system formed by the piston 22 and cylinder 20, the system undergoes resonance, thereby amplifying the motion of the piston and cylinder.

The amplitude of the oscillatory motion of the piston and cylinder is further controlled by applying a control torque to each of the discs 16 and 18 using the motor-generator arrangement which opposes the motion caused by combustion. These applied control torques, which are equal and opposite, are appropriately phase-controlled with respect to the first harmonic of the gas pressure excitation process. Accordingly, and as the skilled person will appreciate, the control torques act as artificial damping, and will closely follow a velocity feedback strategy. The gain in this feedback strategy is, however, restricted to meet power conversion requirements, since if the "damping" is too high the mass-elastic system will respond to higher harmonics of the combustion gas pressures. If this occurs, then a suitable power output from the system may not be achieved.

As the combustion gas pressures are not perfectly periodic, but are in fact cyclo-stationary with, potentially, substantial, cycle-to-cycle variability, the control torques applied to the piston 22 and the cylinder 20 will also tend not to be periodic but will vary from cycle to cycle.

Under normal operations, the above described torque control allows the piston 22 and cylinder 20 to oscillate without any collisions at TDC and BDC. However, under abnormal conditions, it may be possible for collisions to occur. Accordingly, the system may be provided with an annular spigot and blind air-filled dummy cylinder arrangement to prevent any such collisions.

Once the engine 10 has been set in its "steady state" rotating motion, with resonant oscillation being driven by internal combustion in the combustion chamber 21, then the motor-generator arrangement can be used to generate an electrical output from the engine's motion (from the rotation of the discs 16, 18).

Subject to any controlled switching of the motor-generator arrangement from "generating" to "motoring" (e.g. for control purposes) in the manner described above, the combined instantaneous electrical power generated by both of the discs 16 and 18 will be positive. Moreover, the average electrical power output from the system is effectively, if the friction and electrical losses are ignored, equal to the average work done per unit time in expanding the combustion gas pressures. Accordingly, the system may provide close to 100% mechanical-to-electrical conversion efficiency.

As the skilled person will appreciate, the magnitude of the $i^2R$ loss increases with the magnitude of the control torques. Therefore, it is contemplated that gearing may be used to drive the generator-motor arrangement.

As described above, the power supply system can be used to generate an electrical output. Furthermore, however, the system can also be used as an energy store. In particular, the discs 16 and 18 can act as flywheels, i.e. an electrical input applied to the motor-generator arrangement can be used to rotate the discs 16 and 18, therefore storing the electrical energy in the form of mechanical energy (for later recovery as electrical energy by running the system in "generating" mode).

The present invention is particularly, albeit not exclusively, applicable to use in hybrid powertrains.

Figure 4:
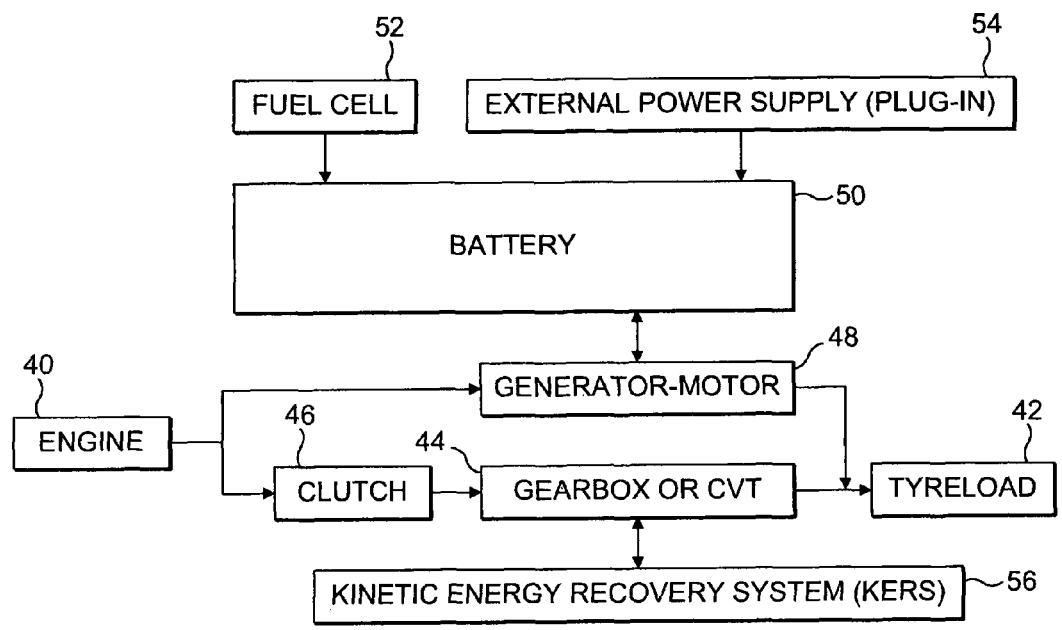
FIG. 4 shows schematically a known hybrid powertrain system.

A conventional hybrid powertrain is shown in FIG. 4, in which an engine 40 is connected to the tyreload 42, firstly via a clutch 46 and gearbox or CVT (continuously variable transmission) 44 (as in conventional powertrains), and secondly via an electric generator-motor 48. In such arrangements, and as is well known in the art, the wheels of the vehicle can be driven using the engine 40 or the motor-generator 48. A energy store 50, such as a battery, is also provided to store excess charge and/or to supply electrical energy to the motor generator 48. The energy store 50 can be supplied (recharged) with electrical energy, for example, using a fuel cell 52 or by being connected to an external power supply 54 such as mains power. A kinetic energy recovery system (KERS) 56, which comprises a flywheel or the like, is also connected to the gearbox or CVT 44 for storing energy (as kinetic energy) generated during a braking manoeuvre and then releasing the (stored) energy as the vehicle accelerates.

Figure 5:
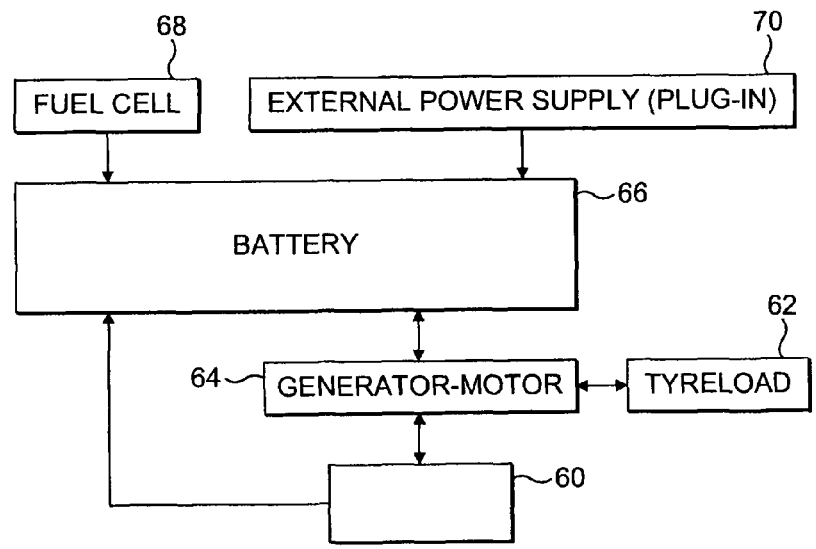
FIG. 5 shows schematically an exemplary hybrid powertrain system utilising a preferred embodiment of the present invention.

A hybrid vehicle powertrain utilising a power supply system according to an embodiment of the present invention is shown in FIG. 5. In this arrangement, a power supply system 60 in accordance with the present invention (e.g. that shown in FIGS. 2 and 2A or FIGS. 3 and 3A) is connected to a motor-generator 64, which in turn is connected to the tyreload 62. Accordingly, in operation, the power supply system 60 is used to generate an electrical output that is supplied to the motor-generator 64, which in turn generates a mechanical output that is used to drive the wheels of the vehicle.

The power supply system 60 can, however, also be used, as described above, as an energy store (e.g. by acting as a flywheel storage system), and thus kinetic energy from, for example, braking can be supplied to the motor-generator 64 and in turn converted to an electrical input for driving the discs of the engine of the power-supply system 60 as a flywheel in the manner discussed above. In other words, the power supply system 60 functions as a kinetic energy recovery system (KERS).

As with the conventional arrangement shown in FIG. 4, the motor-generator 64 is connected to an energy store 66, such as a battery, that is in turn connected to and/or is connectable to, for example, a fuel cell 68 and an external power supply 70. The energy store 66 is further connected to the power supply system 60, and thus can also be supplied (store) energy from the power supply system 60.

(It would also be possible to connect the electrical output of the power supply system 60 to, for example, one or more electrical appliances, in addition to or instead of it being coupled to the generator-motor 64 and the energy store 66.)

As will be appreciated by those skilled in the art, various changes and modifications may be made to the above described embodiments whilst still falling within the scope of the present invention as set forth in the accompanying claims.

As can be seen from the above, the present invention provides a power supply system that can, in its preferred embodiments at least, offer significant weight reductions and improvements in efficiency, thereby making it particularly, albeit not exclusively, suitable for automotive hybrid power supply systems.

This is achieved, in the preferred embodiments of the present invention at least, by generating electrical power using two elastically-coupled "rotors" within a twin generator-motor system. One rotor includes an orbiting toroidal-section-shaped piston which mates with the other rotor that includes an orbiting cylinder, of matching shape. Both rotors spin forward at the same mean speed but oscillate relative to each other through combustion gas-pressure induced resonance. Appropriately controlled generator-motor torques are used to prevent resonance build-up. At the same time, output electrical energy is generated.

The invention claimed is:
1. A power supply system, comprising:
an internal combustion engine having:
a piston-cylinder assembly in which the piston and cylinder rotate about a common axis of rotation and are further arranged such that combustion in the combustion chamber formed between the cylinder and piston causes the piston and cylinder to oscillate relative to each other about their common rotational axis,
one or more resilient members, and a resonant mass-elastic system formed by the piston and cylinder being coupled to said one or more resilient members; and
an electric generator arrangement coupled to the piston-cylinder assembly for generating an electrical output from the motion of the piston and/or cylinder in use.
2. The power supply system of claim 1, wherein the generator arrangement comprises a rotor and a stator, the rotor comprising the piston and/or cylinder and the stator comprising a fixed casing at least partially surrounding the piston and/or cylinder, respectively.

3. The power supply system of claim 1, comprising:
a motor-generator arrangement for generating electricity from the motion of the piston and/or cylinder and for driving and/or controlling rotational motion of the piston and/or cylinder.

4. The power supply system of claim 1, wherein the piston and cylinder are formed as mating toroidal sections.

5. The power supply system of claim 1, wherein the piston is mounted on a first support which rotates about the common axis of rotation, and the cylinder is mounted on a second support which rotates about the common axis of rotation.

6. The power supply system of claim 1, comprising:
a motor arrangement configured to rotationally accelerate the piston and cylinder about their common rotational axis to a greater than zero common angular velocity.

7. The power supply system of claim 1, comprising:
a motor arrangement configured to induce and/or apply torques to the piston and cylinder so as to drive relative oscillation between the piston and cylinder.

8. The power supply system of claim 1, comprising:
a control device configured to generate periodic combustion in the combustion chamber formed between the piston and cylinder so as to generate resonant oscillation between the piston and cylinder.

9. The power supply system of claim 1, comprising:
a motor arrangement configured to induce and/or apply a torque on the piston and/or cylinder that opposes the motion of the piston and/or cylinder, respectively.

10. The power supply system of claim 1, wherein the piston and cylinder rotate at a common angular velocity about the common axis of rotation.

11. A hybrid powertrain comprising:
a power supply system for generating an electrical output;
a motor-generator arrangement coupled to the power supply system for generating a mechanical output; and
means for storing electrical energy coupled to the power supply system and/or the motor-generator arrangement;
wherein said power supply system comprises:
an internal combustion engine having:
a piston-cylinder assembly in which the piston and cylinder rotate about a common axis of rotation and are further arranged such that combustion in the combustion chamber formed between the cylinder and piston causes the piston and cylinder to oscillate relative to each other about their common rotational axis,
one or more resilient members, and a resonant mass-elastic system formed by the piston and cylinder being coupled to said one or more resilient members; and
an electric generator arrangement coupled to the piston-cylinder assembly for generating an electrical output from the motion of the piston and/or cylinder in use.

12. A method of generating an electrical output using an internal combustion engine having:
a piston-cylinder assembly in which the piston and cylinder rotate about a common axis of rotation and are further arranged such that combustion in the combustion chamber formed between the cylinder and piston causes the piston and cylinder to oscillate relative to each other about their common rotational axis,
one or more resilient members, and a resonant mass-elastic system formed by the piston and cylinder being coupled to said one or more resilient members,
the method comprising:
using combustion in the combustion chamber formed by the piston and cylinder to cause relative oscillatory motion between the piston and cylinder about their common rotational axis; and
using a generator arrangement coupled to the piston-cylinder assembly to generate an electrical output from the motion of the piston and/or cylinder.

13. The method of claim 12, comprising:
inducing and/or applying torques to the piston and cylinder to drive relative oscillation between the piston and cylinder.

14. The method of claim 12, comprising:
generating periodic combustion in the combustion chamber formed between the piston and cylinder to generate resonant oscillation between the piston and cylinder.

15. The method of claim 12, comprising:
inducing and/or applying a torque on the piston and/or cylinder that opposes the motion of the piston and/or cylinder, respectively.

16. The method of claim 12, comprising:
rotationally accelerating the piston and cylinder about their common rotational axis to a greater than zero common angular velocity.

* * * * *

UNITED STATES PATENT AND TRADEMARK OFFICE
CERTIFICATE OF CORRECTION

PATENT NO. : 8,519,553 B2  Page 1 of 1
APPLICATION NO. : 12/740669
DATED : August 27, 2013
INVENTOR(S) : Julian Francis Dunne It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this

Fifteenth Day of September, 2015

Michelle K. Lee
*Director of the United States Patent and Trademark Office*